US008291588B2

(12) United States Patent
Sciuto et al.

(10) Patent No.: US 8,291,588 B2
(45) Date of Patent: Oct. 23, 2012

(54) METHOD OF MANUFACTURING AND CONTROLLING A BUTTERFLY VALVE FOR AN INTERNAL COMBUSTION ENGINE

(75) Inventors: Marcello Sciuto, San Giovanni in Persiceto (IT); Gabriele Giuliani, Budrio (IT); Mario Marconi, Bologna (IT); Alessandro Peciarolo, Bologna (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 1001 days.

(21) Appl. No.: 12/323,639

(22) Filed: Nov. 26, 2008

(65) Prior Publication Data

US 2009/0144979 A1 Jun. 11, 2009

(30) Foreign Application Priority Data

Nov. 28, 2007 (EP) .................................... 07425753

(51) Int. Cl.
*B21K 1/22* (2006.01)
*B23Q 17/00* (2006.01)
*F02D 11/10* (2006.01)

(52) U.S. Cl. ... 29/888.4; 29/404; 29/407.01; 29/407.05; 29/407.08; 73/114.32; 123/460

(58) Field of Classification Search ................. 29/888.4, 29/888.41, 888.42, 888.43, 888.46, 890.12, 29/404, 407.01, 407.05, 407.08; 123/375, 123/395–400, 403; 251/173, 305; 73/114.31–114.37

See application file for complete search history.

(56) References Cited

U.S. PATENT DOCUMENTS

| | | | | |
|---|---|---|---|---|
| 6,236,199 | B1 * | 5/2001 | Irle et al. | 324/207.17 |
| 6,789,414 | B2 * | 9/2004 | Fuwa | 73/114.32 |
| 6,874,468 | B2 * | 4/2005 | Watanabe | 123/377 |
| 7,623,328 | B2 * | 11/2009 | Machida et al. | 361/31 |
| 2009/0205610 | A1 * | 8/2009 | Jumonji et al. | 123/337 |

FOREIGN PATENT DOCUMENTS

| | | |
|---|---|---|
| DE | 4005255 | 8/1991 |
| DE | 19604133 | 8/1997 |
| EP | 0 909 886 | 4/1999 |
| EP | 0 928 889 | 7/1999 |

* cited by examiner

*Primary Examiner* — Sarang Afzali

(74) *Attorney, Agent, or Firm* — Gottlieb, Rackman & Reisman, P.C.

(57) ABSTRACT

A method of manufacturing and controlling a butterfly valve for an internal combustion engine; the manufacturing and control method includes the steps of: establishing a maximum gaseous flow rate value which may flow through the feeding pipe when the butterfly plate is in the closing position; determining a conventional closing position at which the gaseous flow rate which flows through the feeding pipe is essentially equal to the maximum gaseous flow rate value; driving an actuator device so as not to normally pass the conventional closing position; and dimensioning the position of a catch element, so that when a rotational shaft abuts against the catch element the gaseous flow rate which flows through the feeding pipe is essentially lower than the maximum gaseous flow rate value.

5 Claims, 2 Drawing Sheets

METHOD OF MANUFACTURING AND CONTROLLING A BUTTERFLY VALVE FOR AN INTERNAL COMBUSTION ENGINE

TECHNICAL FIELD

The present invention is related to a method of manufacturing and controlling a butterfly valve for an internal combustion engine.

The present invention is advantageously applied to a butterfly valve arranged upstream of an intake manifold in an internal combustion engine, to which explicit reference will be made in the following description without therefore loosing in generality.

BACKGROUND ART

A butterfly valve, which is arranged upstream of an intake manifold and adjusts the flow rate of the air which is fed to the cylinders, may be included in internal combustion engines. A typical currently marketed butterfly valve has a valve body provided with a tubular feeding pipe through which the air aspirated by the internal combustion engine flows; a butterfly plate, which is keyed onto a rotating shaft to rotate between an opening position and a closing position of the feeding pipe, is accommodated inside the feeding pipe. The rotation of the butterfly plate is controlled by an actuator device normally comprising an electric motor coupled to the rotational butterfly plate shaft by means of a gear transmission and at least one spring which pushes the butterfly plate shaft to the closing position.

A position sensor, which is adapted to detect the angular position of the rotational shaft (i.e. of the butterfly plate) is coupled to the rotational shaft carrying the butterfly plate; in modern butterfly valves, the position sensor is of the contactless type, i.e. comprises a rotor integral with the rotational shaft and a stator, which is arranged in fixed position, facing the rotor and electromagnetically coupled to the rotor itself.

In a butterfly valve, there is also present a catch element, which limits the rotation of the rotational shaft forming a mechanical end stroke which defines the maximum closing position reachable by the rotational shaft (i.e. by the butterfly plate). The function of the catch element is to mechanically prevent the butterfly plate from jamming by interference against the feeding pipe, which situation could cause the deformation of the butterfly plate, the deformation of the feeding pipe or, in worse case, the sticking of the butterfly valve.

Currently, the catch element is defined by a catch screw, which is screwed through the valve body and has a head arranged outside the valve body and a free end which defines the mechanical end stroke of the rotational shaft (i.e. of the butterfly plate). During the step of manufacturing, each butterfly valve is arranged in a test station, in which the value of the air flow which flows through the feeding pipe is measured in real time; in these conditions, the axial position of the catch screw is adjusted by screwing or unscrewing the catch screw itself with respect to the valve body, so that when the rotational shaft rests against the catch screw the air flow rate which flows through the feeding pipe is lower than a threshold value established by the design specifications of the butterfly valve. Preferably, after adjusting the axial position of the catch screw, the catch screw itself is locked with respect to the valve body to prevent any type of later movement (typically by effect of the vibrations generated by the engine in use).

After establishing the position of the catch screw, the position sensor is calibrated by defining an offset point corresponding to the position of the rotational shaft resting against the catch screw and then by defining a position sensor gain; subsequently, the software linearization of the position sensor output is performed by using the previously defined offset point and gain.

During the use of the internal combustion engine, the butterfly valve control works to prevent the rotational shaft from coming into contact with the catch screw (except in a highly controlled manner in particular situations and with very slow impact speed); indeed, when the rotational shaft impacts against the catch screw, the gear transmission which transmits the motion from the electric motor to the rotational shaft is subjected to high mechanical stresses which may determine the breakage of the teeth of the gear transmission.

During the use of the internal combustion engine, a self-learning operation is periodically run (typically each time the internal combustion engine is stopped, i.e. in after-run mode) which consists in making the rotational shaft (i.e. the butterfly plate) abut against the catch screw to acquire the offset point again. Such a periodical acquisition of the offset point is necessary because the butterfly valve may get soiled in time and thus an impact which subjects the gear transmission to high mechanical stresses may occur even before the offset point acquired at the end of the manufacturing of the butterfly valve.

From the above, it is apparent that in a known butterfly valve the management of the catch screw is difficult and thus expensive due to the need to calibrate the catch screw and to the need to periodically run a self-learning operation during the use of the internal combustion engine which consists in making the rotational shaft (i.e. the butterfly plate) abut against the catch screw in order to acquire the offset point again.

DISCLOSURE OF INVENTION

It is the object of the present invention to provide a method of manufacturing and controlling a butterfly valve for an internal combustion engine, such a method being free from the above-described drawbacks and, specifically, being easy and cost-effective to implement.

According to the present invention, a method of manufacturing and controlling a butterfly valve for an internal combustion engine is provided as claimed in the attached claims.

BRIEF DESCRIPTION OF THE DRAWINGS

The present invention will now be described with reference to the accompanying drawings, which disclose a non-limitative embodiment thereof, in which.

PREFERRED EMBODIMENTS OF THE INVENTION

Figure 1:
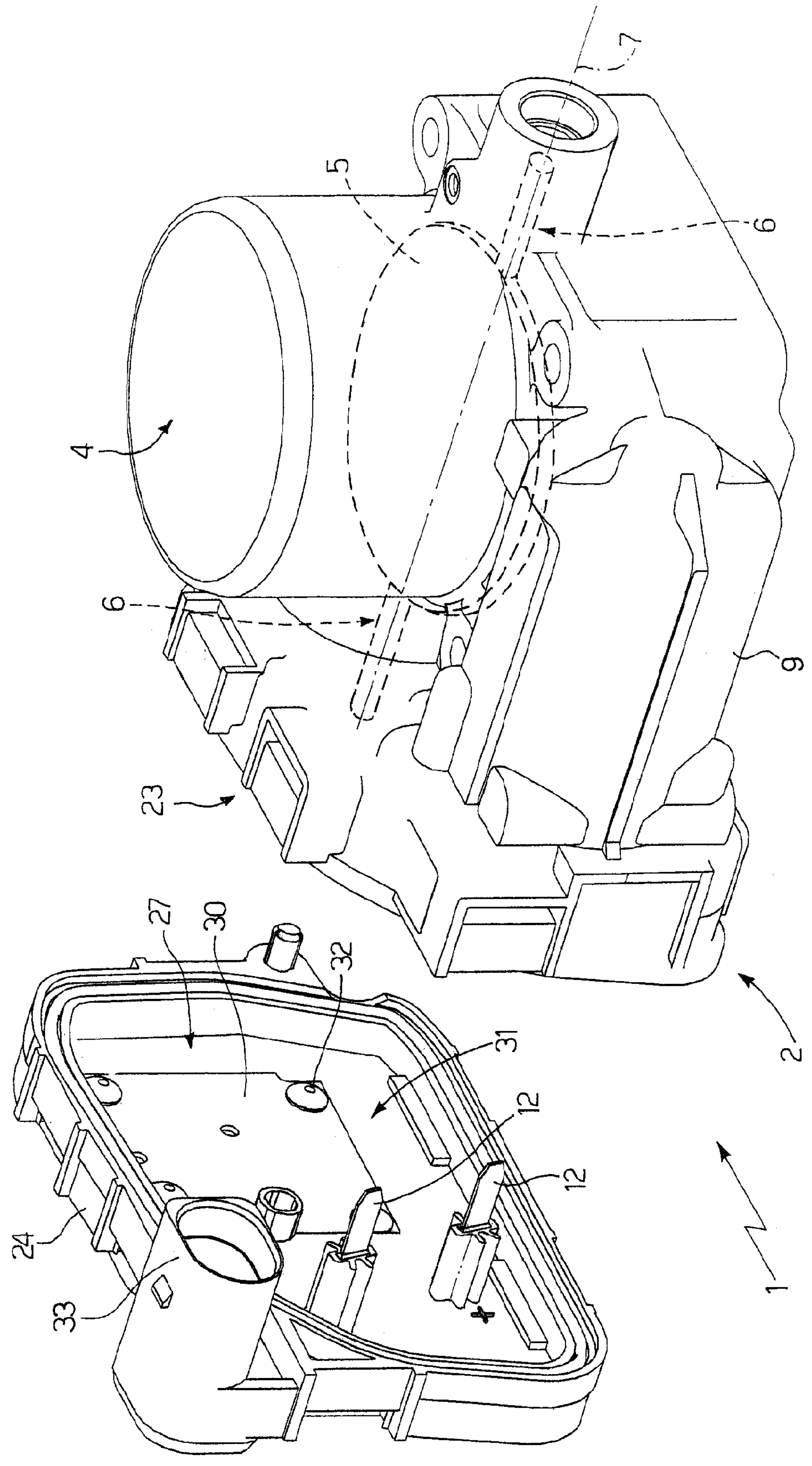
FIG. 1 is a perspective, partially exploded view with parts removed for clarity of a butterfly valve manufactured and controlled according to the present invention.

In FIG. 1, numeral 1 indicates as a whole an electronically controlled butterfly valve for an internal combustion engine (not shown). The butterfly valve 1 comprises a valve body 2 accommodating an actuator device provided with an electric motor 3 (shown in FIG. 2), a tubular circular-section feeding pipe 4 through which the air aspirated by the internal combustion engine flows, and a butterfly plate 5 (diagrammatically shown with a dashed line), which is circular-shaped, engages the feeding pipe 4 and rotates between an opening position and a closing position of the feeding pipe 4 by effect of the action of an actuator device. The butterfly plate 5 is keyed onto a rotational shaft 6 having a longitudinal rotation axis 7 in order to rotate under the control of the actuator device between the opening position and the closing position by effect of the action of the actuator device.

Figure 2:
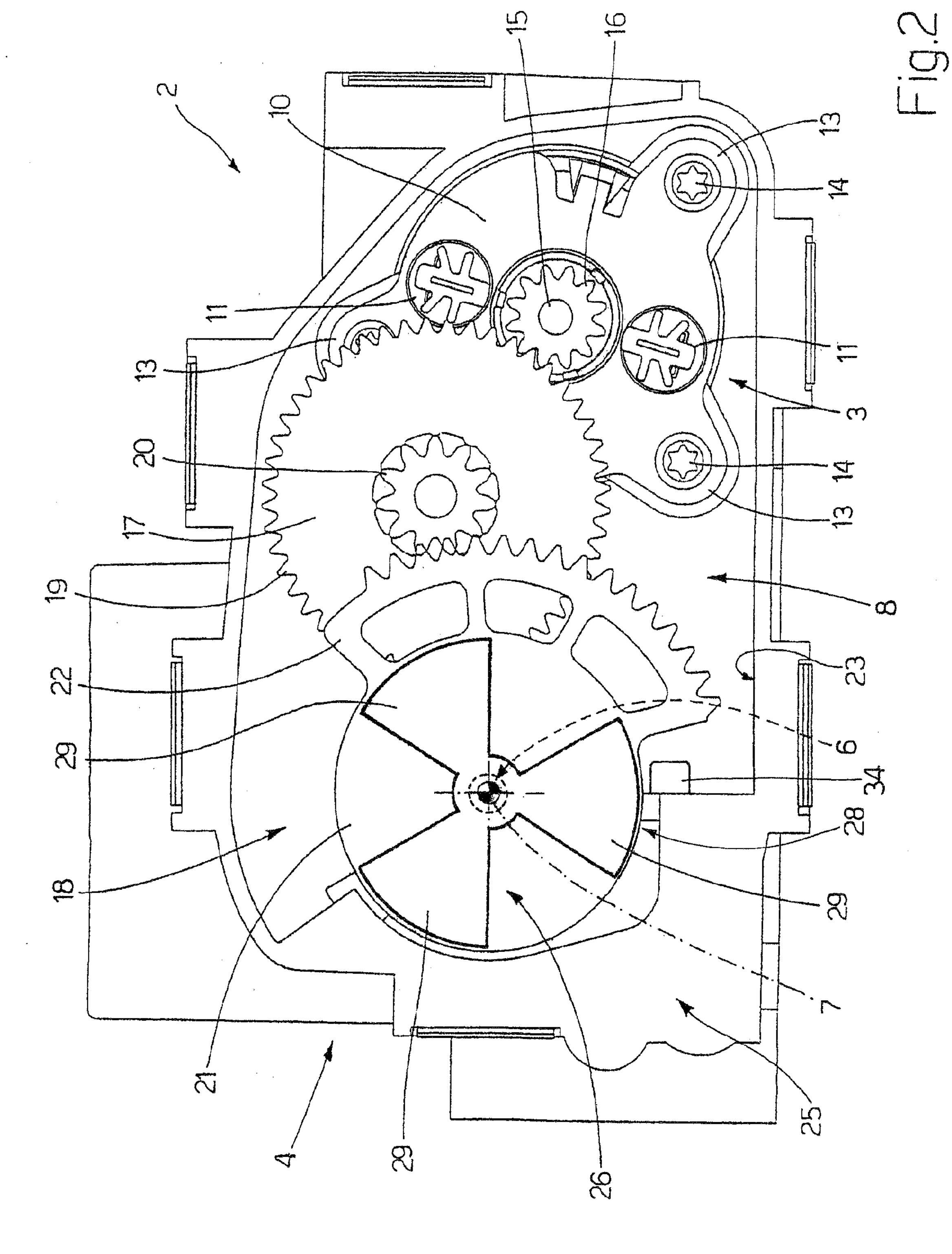
FIG. 2 is a front view with parts removed for clarity of the butterfly valve in FIG. 1.

As shown in FIG. 2, the actuator device comprises the electric motor 3 which is coupled to the rotational shaft 6 by means of a gear transmission 8, a return spring (not shown and coupled to the rotational shaft 6) adapted to rotate the butterfly plate 5 towards the closing position, and possibly a contrast spring (not shown and coupled to the shaft 6) adapted to rotate the butterfly plate 5 towards a partial opening position or limp-home position against the bias of the return spring. Specifically, the contrast spring which may rotate the butterfly plate 5 towards the limp-home against the bias of the return spring is present if the butterfly valve 1 is intended to be used in an internal combustion engine running according to the Otto controlled-ignition cycle of the mixture (i.e. fed with gasoline or the like), while the contrast spring is not present if the butterfly valve 1 is intended to be used in an internal combustion engine running according to the Diesel spontaneous-ignition cycle of the mixture (thus fed with diesel fuel or the like).

The electric motor 3 has a cylindrical body, which is arranged in a tubular housing 9 (shown in FIG. 1) arranged by the side of the feeding pipe 4 and is maintained in a determined position inside the tubular housing 9 by a metallic plate 10; the metallic plate 10 has a pair of female electric connectors 11, which are electrically connected to the electric motor 3 and are adapted to be engaged by a pair of corresponding male electric connectors 12 (shown in FIG. 1). In order to ensure a correct fastening of the electric motor 3 to the valve body 2, the plate 10 has three perforated radial protrusions, through which the corresponding fastening screws 14 to the valve body 2 are inserted.

The electric motor 3 has a shaft 15 ending with a toothed wheel 16, which is mechanically connected to the rotational shaft 6 by means of an idle toothed wheel 17 interposed between the toothed wheel 16 and an end gear 18 keyed onto the rotational shaft 6. The toothed wheel 17 has a first set of teeth 19 coupled to the toothed wheel 16 and a second set of teeth 20 coupled to the end gear 18; the diameter of the first set of teeth 19 is different from the diameter of the second set of teeth 20, thus the toothed wheel 17 determines a non-unitary transmission ratio. The end gear 18 is defined by a solid central cylindrical body 21 keyed onto the rotational shaft 6 and provided with a circular crown portion 22 having a set of teeth coupled to the toothed wheel 17.

The gear transmission 8 and the plate 10 are arranged in a chamber 23 of the valve body 2, which is closed by a removable lid 24 (shown in FIG. 1).

As shown in FIGS. 1 and 2, the butterfly valve 1 comprises an inductive position sensor 25 of the contactless type, which is coupled to the rotational shaft 6 and is adapted to detect the angular position of the rotational shaft 6 and, thus, of the butterfly plate 5 to allow a feedback control of the position of the butterfly plate 5 itself. The position sensor 25 is of the type described in U.S. Pat. No. 6,236,199B1 and comprises a rotor 26 integral with the rotational shaft 6 and a stator 27 supported by the lid 24 and arranged facing the rotor 26 in use; the rotor 26 is defined by a flat metallic turn 28, which is closed in short-circuit, has a set of lobes 29, and is incorporated in the central cylindrical body 21 of the end gear 18. The stator 27 of the position sensor 25 comprises a support header 30, which is connected to an internal wall 31 of the lid 24 by means of four plastic rivets 32.

As shown in FIG. 1, the lid 24 is provided with a female electric connector 33, which comprises a set of electric contacts (not shown in detail): two electric contacts are connected to the male electric connectors 12 adapted to feed the electric motor 3, while the other electric contacts are connected to the stator 27 of the position sensor 25; when the lid 24 is arranged in contact with the valve body 2 to close the chamber 23, the female electric connector 33 is arranged over the tubular housing 9 of the electric motor 3.

As shown in FIG. 2, a fixed catch element 34 is included, which consists of a protrusion of the valve body 2 which extends into the chamber 23 and limits the rotation of the rotational shaft 6 constituting a mechanical end stroke which defines the maximum closing position physically reachable by the rotational shaft 6 itself (and thus by the butterfly plate 5). Specifically, the catch element 34 is arranged so as to interfere with the trajectory performed by the circular crown portion 22 which is provided with a set of teeth coupled to the toothed wheel 17 and is angularly integral with the rotational shaft 6. The function of the catch element 34 is to mechanically prevent the butterfly plate 5 from jamming by interference against the feeding pipe 4, situation which could determine the deformation of the butterfly plate 5, the deformation of the feeding pipe 2 or, in worse case, the sticking of the butterfly valve 1.

It is worth noting that the catch element 34 is fixed and adjustment-free; i.e. the catch element 34 consists of a fixed body, the position of which cannot be adjusted (calibrated) in any manner.

During the step of designing the butterfly valve 1, a maximum gaseous flow rate $V_{max}$ which may flow through the feeding pipe 4 when the butterfly plate 5 is in the closing position is determined; the maximum value $V_{max}$ is normally established by the design specifications of the butterfly valve 1 and is used to guarantee that in the closing position the flow rate of air which leaks through the butterfly valve 1 is essentially negligible for engine control purposes. By way of example, in a butterfly valve 1 for an internal combustion engine running according to the Diesel spontaneous-ignition cycle of the mixture (thus fed with diesel fuel or the like), the maximum value $V_{max}$ may be between 4 and 6 kg/h (kg of gaseous mass which flow in one hour).

The position of the catch element 34 is dimensioned so that when the rotational shaft 6 (i.e. the circular crown portion 22 integral with the rotational shaft 6) abuts against the catch element 34, the gaseous flow rate which flows through the feeding pipe 4 is essentially and considerably lower than the maximum gaseous flow rate value $V_{max}$; specifically, when the rotational shaft 6 (i.e. the circular crown portion 22 integral with the rotational shaft 6) abuts against the catch element 34, the gaseous flow rate which flows through the feeding pipe 4 must be lower than the maximum gaseous flow rate value $V_{max}$ by at least one 1 kg/h and preferably by at least 2 kg/h.

The position of the rotational shaft 6 abutting against the catch element 34 is used as an offset point for calibrating and programming the position sensor 25; in other words, the rotational shaft 6 is arranged in the offset point, i.e. is abuttingly arranged against the catch element 34, and in this position the reading supplied by the position sensor 25 is detected to determine the reading provided by the position sensor 25 at the offset point. Subsequently, the slope of the position sensor 25 is programmed on the offset point and then the linearization of the output of the position sensor 25 itself is performed.

During the step of manufacturing the butterfly valve 1, the butterfly valve 1 itself is arranged in a test station (known and not shown), in which the air flow value which flows through the feeding pipe 4 is measured in real time. Under these conditions, the rotational shaft 6 (i.e. the circular crown portion 22 integral with the rotation shaft 6) is abuttingly arranged against the catch element 34 to determine the reading supplied by the position sensor 25 at the offset point. Subsequently, the rotational shaft 6 is brought to a conventional closing position at which the gaseous flow rate which flows through the feeding pipe 4 is equal to the maximum gaseous flow rate value $V_{max}$; the reading supplied by the position sensor 25 is determined in such a conventional closing position so as to know and store the reading supplied by the position sensor 25 when the rotational shaft 6 is in the conventional closing position.

During the use of the butterfly valve 1, the actuator device of the butterfly valve 1 itself is driven so as not to pass the conventional closing position; it is worth emphasizing that, by definition, in the conventional closing position the gaseous flow rate which flows through the feeding pipe 4 is equal to the maximum gaseous flow rate value $V_{max}$ and thus, in order to comply with the design requirements, the butterfly valve 1 never needs to pass the conventional closing position. Furthermore, the conventional closing position is relatively distant from the maximum closing position physically reachable by the rotational shaft 6 and defined by the catch element 34; in this manner, when the rotational shaft 6 is brought to the conventional closing position (or even close to the conventional closing position) the rotational shaft 6 may never reach the maximum closing position physically reachable, i.e. may never impact into the catch element 34. This certainty is also maintained as time goes, because the effect of the possible soiling to which the butterfly valve 1 may be subjected is however much lower than the distance existing between the conventional closing position and the maximum closing position physically reachable defined by the catch element 34. Consequently, during the normal use of the butterfly valve 1 it is not necessary to self-learn the offset point of the position sensor 25 to track the deviation due to soiling, because during the normal use of the butterfly valve 1 the rotational shaft 6 is always stopped at the conventional closing position and thus at an abundant safety distance from the maximum closing position physically reachable defined by the catch element 34.

It is worth emphasizing that during the normal use of the butterfly valve 1 the offset point of the position sensor 25 is not self-learned to track the deviation due to soiling; however, during the normal use of the butterfly valve 1 it is possible to perform other types of checks (other than the offset point) on the reading supplied by the position sensor 25 to verify other types of deviation of the position sensor 25 and/or to verify the correct operation of the position sensor 25 itself.

Briefly, in a conventional butterfly valve 1, the position of the catch element 34 is adjustable so as to make the conventional closing position (in which the gaseous flow rate which flows through the feeding pipe 4 is equal to the maximum gaseous flow rate value $V_{max}$) match with the maximum closing position physically reachable; this choice implies various drawbacks because it obliges both to adjust the position of the catch element 34 during the step of manufacturing the butterfly valve 1, and to periodically self-learn the conventional closing position in order to prevent minor deviations due to soiling from causing a violent impact of the rotational shaft 6 against the catch element 34. On the other hand, in the innovative butterfly valve 1 described above, the position of the catch element 34 is fixed and the conventional closing position (in which the gaseous flow rate which flows through the feeding pipe 4 is equal to the maximum gaseous flow rate value $V_{max}$) is away from the maximum closing position physically reachable; in this manner, the position of the catch element 34 does not need to be adjusted during the step of manufacturing the butterfly valve 1 and the conventional closing position does not need to be periodically self-learned because possible soiling cannot fill the distance existing between the conventional closing position and the maximum closing position physically reachable.

It is worth emphasizing that the actuator device could be driven to make the rotational shaft 6 slightly pass the conventional closing position for a short time by effect of an over-shutting; indeed, by allowing a slight over-shutting in the position of the rotational shaft 6 the movement dynamic of the rotational shaft 6 may be faster and prompter.

In the embodiment shown in the accompanying figures, the butterfly valve 1 adjusts the flow rate of the air aspirated by the internal combustion engine which may run according to the Otto controlled-ignition cycle of the mixture (thus fed with gasoline or the like) or may run according to the Diesel spontaneous-ignition cycle of the mixture (thus fed with diesel fuel or the like). Obviously, in other applications, the butterfly valve 1 may adjust a flow rate of air other than the air aspirated by the internal combustion engine, e.g. the flow rate of recirculated air in an EGR circuit.

The invention claimed is:

1. A method of manufacturing and controlling a butterfly valve (1) for an internal combustion engine (1); the butterfly valve (1) comprises:

- a valve body (2);
- a tubular feeding pipe (4) defined in the valve body (2);
- a rotational shaft (6) which rotates about a rotation axis (7);
- a butterfly plate (5), which is arranged inside the feeding pipe (4) and is keyed onto the rotational shaft (6) to rotate between an opening position and a closing position of the feeding pipe (4);
- a catch element (34), which limits the rotation of the rotational shaft (6), forming a mechanical end stroke which defines a maximum closing position physically reachable by the rotational shaft (6);
- a position sensor (25) for detecting the angular position of the rotational shaft (6); and an actuator device connected to the rotational shaft (6) to rotate the rotational shaft (6) itself;
- the manufacturing and control method comprises the steps of:

establishing a maximum gaseous flow rate value ($V_{max}$) which may flow through the feeding pipe (4) when the butterfly plate (5) is in the closing position;

- determining a conventional closing position at which the gaseous flow rate which flows through the feeding pipe (4) is essentially equal to the maximum gaseous flow rate value ($V_{max}$); and
- driving the actuator device so as not to normally pass the conventional closing position;
- the manufacturing and control method is characterized in that it comprises the further steps of:
- dimensioning a position of the catch element (34), so that when the rotational shaft (6) abuts against the catch element (34) the gaseous flow rate which flows through the feeding pipe (4) is essentially lower than the maximum gaseous flow rate value ($V_{max}$);

using the position of the rotational shaft (6) abutting against the catch element (34) as offset point for calibrating and programming the position sensor (25); and determining, during an initial step of calibrating, a reading supplied by the position sensor (25) when the rotational shaft (6) is brought to the conventional closing position at which the gaseous flow rate which flows through the feeding pipe (4) is equal to the maximum gaseous flow rate value ($V_{max}$).

2. A manufacturing and control method according to claim 1, wherein the position of the catch element (34) is dimensioned so that when the rotational shaft (6) abuts against the catch element (34) the gaseous flow rate which flows through the feeding pipe (4) is lower by at least 1 kg/h than the maximum gaseous flow rate value ($V_{max}$).

3. A manufacturing and control method according to claim 1, wherein the position of the catch element (34) is dimensioned so that when the rotational shaft (6) abuts against the catch element (34) the gaseous flow rate which flows through the feeding pipe (4) is lower by at least 2 kg/h than the maximum gaseous flow rate value ($V_{max}$).

4. A manufacturing and control method according to claim 1, wherein the catch element (34) is a fixed and adjustment-free catch element (34).

5. A manufacturing and control method according to claim 1 wherein the offset point of the position sensor (25) during the normal use of the butterfly valve (1) does not require the step of self-learning.

* * * * *